United States Patent Office

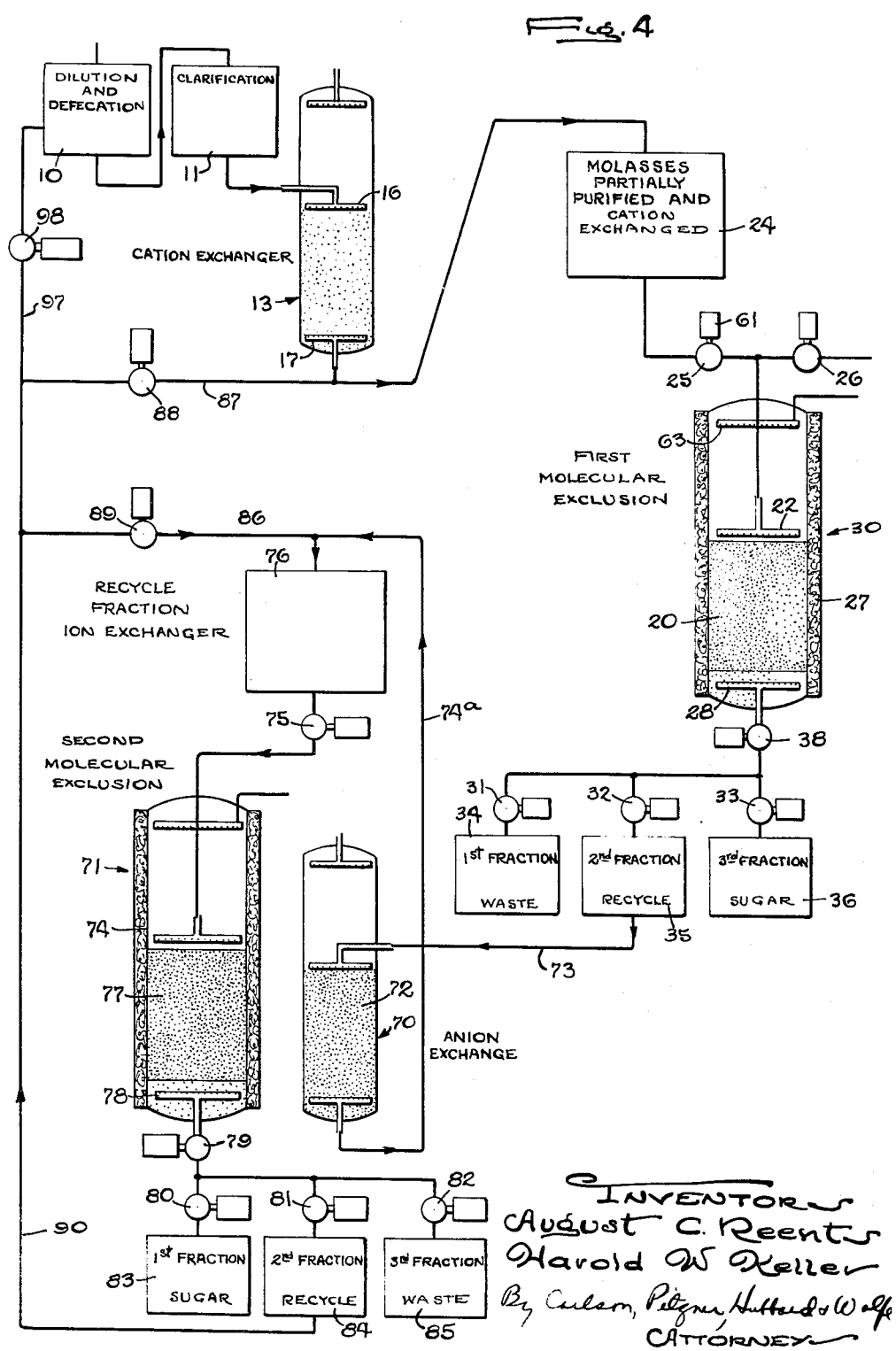

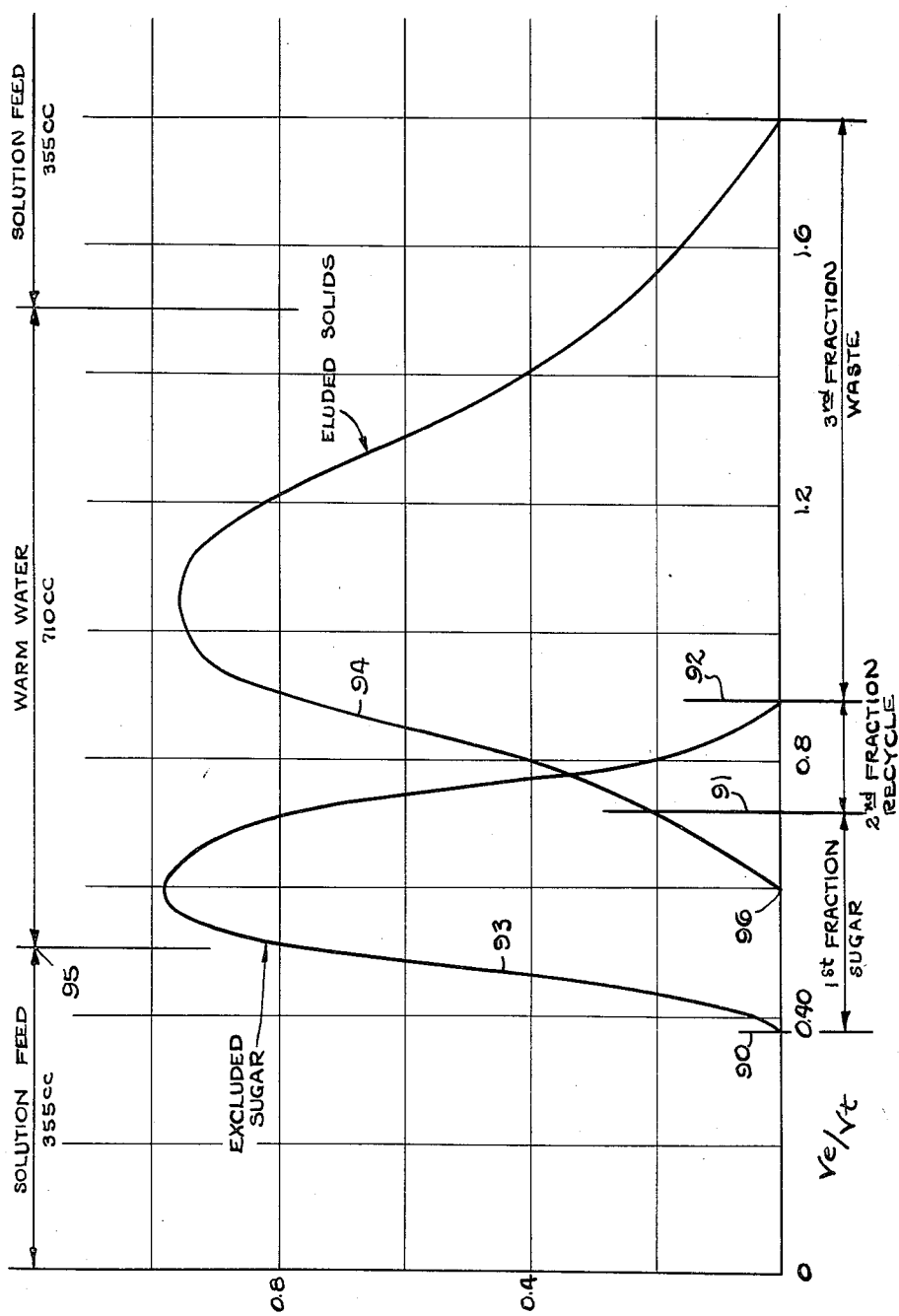

2,937,959
Patented May 24, 1960

2,937,959

PURIFICATION OF SUGAR SOLUTIONS BY MOLECULAR EXCLUSION

August C. Reents and Harold W. Keller, Rockford, Ill., assignors to Illinois Water Treatment Co., Rockford, Ill., a corporation of Illinois Filed Oct. 23, 1958, Ser. No. 769,132

10 Claims. (Cl. 127—46)

This invention relates to the separation of dissolved nonsugar solids from sugar in a syrup such as molasses so as to permit a further recovery of sugar, the separation being achieved by contacting the solution with a material which possesses a substantially different adsorptive capacity for the highly ionizable solute such as inorganic salts on the one hand than for the molecules of the weakly ionized solute or sugar, the solute thus adsorbed and retained being removed by subsequent washing of the material with water. With the materials already known for effecting such molecular exclusion, some have a greater adsorption capacity for the organic component of the solution, thus excluding the inorganic component in the passage of the solution through the treating bed. The reverse action occurs with other known materials, the inorganic solute being first adsorbed and the sugar excluded so as to appear in the initial effluent.

As disclosed in Dow Chemical Company Patent No. 2,684,331, certain ordinary ion exchange resins are used in carrying out the first of the above mentioned molecular exclusion methods. An aqueous solution containing a highly ionizable substance such as an inorganic salt and a less ionizable substance such as an organic compound is first brought into contact with a body of an ion exchange agent which selectively adsorbs the nonionized solute leaving the highly ionized solute in the surrounding liquid. In the second step of the cycle, the excluded solute is washed out of the bed with water. Finally, by further washing, the weakly ionized solute adsorbed by the ion exchange agent is removed and collected as a separate fraction.

The reverse or second molecular exclusion method above mentioned is described in a publication of the Technical Service and Development Department of Dow Chemical Company entitled "Ion Retardation" and reprinted November 1957. This process is also carried out by passing an aqueous solution containing the several solutes through a column containing a special type of resin, then rinsing the column with water and collecting the effluent fractions. In the case of a sugar solution, the sugar is first excluded and appears in the first fraction, the adsorbed non-sugars being in the final wash water.

Prior attempts have been made to utilize the foregoing processes to separate sugars from sodium chloride which constitutes the major portion of the ash constituents of commercial sugar solutions. In discussing this use of the first exclusion method, the originators of the method stated (Industrial and Engineering Chemistry, vol. 45, page 233, January 1952):

"One of the first conceived applications for this exclusion process was the separation of sugar and salt. However, sodium chloride cannot be separated from either sucrose or d-glucose, probably because of the relative immobility and size of these large hydrated molecules."

We have discovered that the failure of such attempts to purify sugar solutions is attributable, not to the inability of available resins to receive or exclude sucrose molecules initially, but rather to the rapid and unexpected decrease in the size of the particle pores as a result of acquisition by the resin of the multivalent ions such as divalent calcium or magnesium present in sugar solutions. Although the percentage of such divalent ions is small, usually about one-fifth of the sodium and potassium cations in most commercial sugar solutions, some ion exchange occurs thus substituting calcium or magnesium for the sodium or other monovalent alkali metal cation of the resin whose pore size is thereby reduced appreciably. As a result, the efficiency of the exclusion action is impaired after a comparatively few cycles thus rendering the process unsuited for practical use in purifying sugar solutions on an economical basis.

We have discovered that this same impairment in efficiency of the exclusion occurs when multivalent and cations such as calcium, magnesium sulphate and phosphate ions are present in the resin used in the second molecular exclusion method above described.

Based on the foregoing discoveries, the present invention aims, by a preliminary treatment, to remove substantially all of the exchangeable multivalent ions from the sugar solution before subjecting the same to the excluding resin thereby reducing the ratio of divalent to monovalent ions to such an extent that the resin will remain uncontaminated and will operate at high efficiency for many hundreds of exclusion cycles. In carrying out this object when using cation exchange resin as the excluding agent, the invention consists generally in first treating the sugar solution to convert the divalent calcium and magnesium ions to monovalent ions such as sodium, or to convert the multivalent anions to a monovalent anion such as chloride in case the excluding resin will exchange anions, or to convert both multivalent cations and anions to monovalent ions where the excluding resin includes both cation and anion exchange materials. The solution thus treated is passed through a bed of the excluding resin having monovalent ions in the exchange position, thereby excluding one of the solutes while retaining the other within the resin bed. Finally, the resin is washed to segregate the excluded and adsorbed solution components in successive fractions.

Another object is to increase the overall efficiency of the improved process by effecting the molecular exclusion in a succession of steps using exclusion agents of different types and acting reversely in the two ways above described.

A more detailed object is to pass the sugar solution to be purified first through a column capable of excluding the inorganic bodies so as to segregate these components and the sugar in first and third fractions and obtain an intermediate fraction or mixture of the two components which are then subjected to molecular exclusion in a second column adapted for the exclusion of the sugar component.

The invention also resides in the novel manner of accelerating the excluding action through the use of heat and in utilizing the ion exchange bed to remove substantially all of the divalent ions from the sugar solution preparatory to the ion exclusion.

Other objects and advantages of the invention will become apparent from the following detailed description taken in connection with the accompanying drawings, in which.

Figure 3:
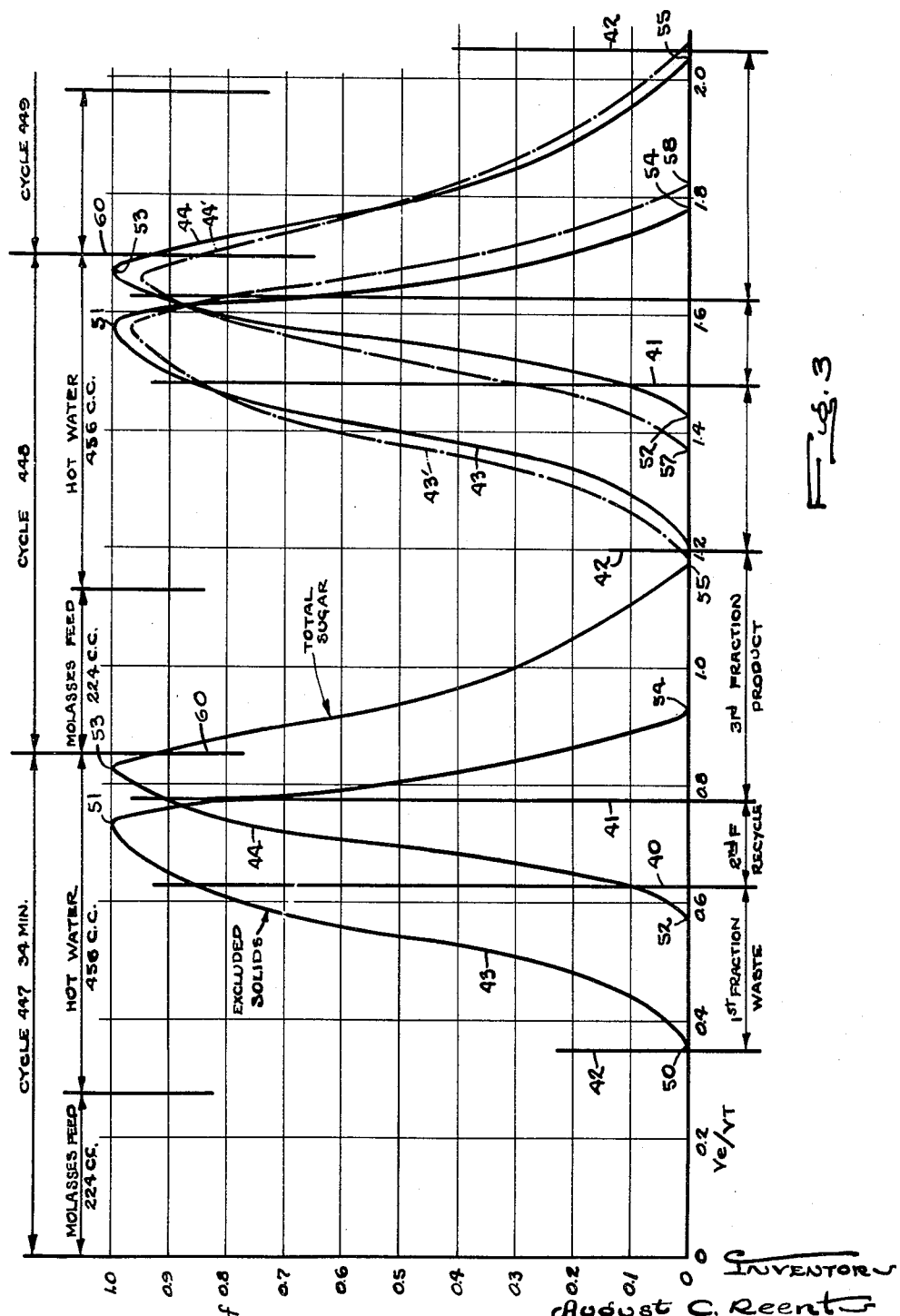

The curves of Fig. 3 show the changing solute concentrations in typical molecular exclusion cycles.

Fig. 4 is a flow diagram of a modification of the improved sugar purifying process.

Fig. 5 shows curves similar to Fig. 3 resulting from the use of a different type of excluding resin.

While our invention is suitable for use in purifying numerous commercially available sugar solutions, we have illustrated and will describe herein its application to the purification of standard B-molasses which is an intermediate residue produced in the present day method of refining cane sugar. The composition of such molasses varies with soil and climate conditions, a typical analysis of Barahona molasses by weight being:

|  | Percent |
|---|---|
| Sucrose | 41.2 |
| Alkali salts: | |
| Sodium as $Na_2O$ | .6 |
| Potassium as $K_2O$ | 4.4 |
| Alkaline earth salts: | |
| Ca as CaO | 1.9 |
| Mg as MgO | 0.1 |
| Water | 17.8 |
| Other solids | 34.0 |

The concentration of such molasses usually varies from 80–88 Brix.

Figure 1:
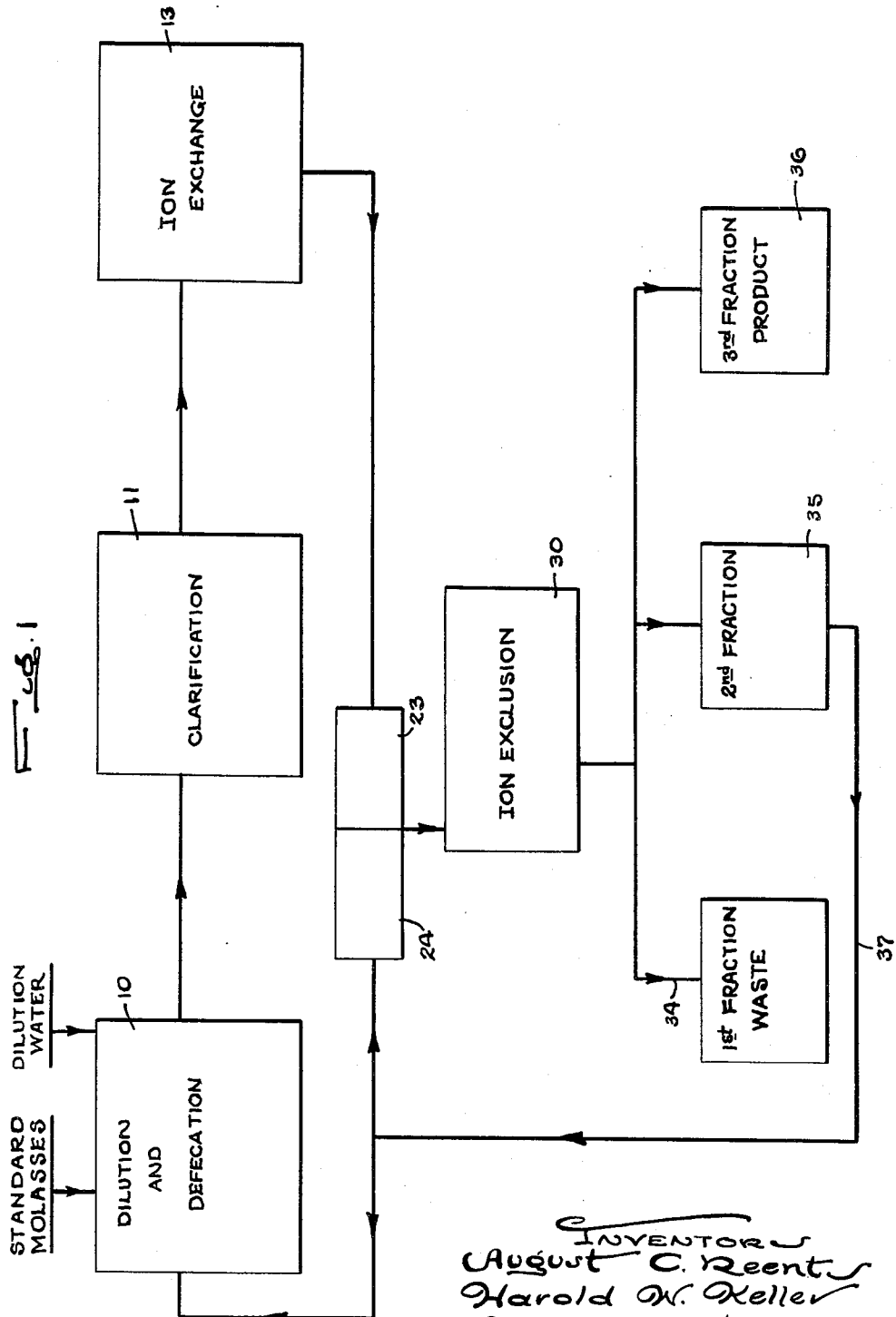
Figure 1 is a flow diagram for the initial part of a process for recovering sugar from molasses in accordance with the present invention.

As a preliminary to treatment in accordance with the present invention, the molasses solution is clarified by defecation in a manner well understood in the art and indicated at 10 (Fig. 1). In a typical treatment, the molasses remaining as a mother liquor after one or more crystallizations of sucrose from a concentrated syrup is diluted with water to a concentration of about 56 Brix, treated first with an oxide or hydroxide of calcium or magnesium to bring the mixture to a pH value of between 8.5 and 9.5 and then with an acid-acting agent to bring the mixture to a pH value of from 6.7 to 6.9. The precipitate formed upon heating the resulting mixture is removed by settling and centrifuging or filtration as indicated at 11.

In order to effect optimum conversion of the divalent ions to monovalent ion, it is preferred to pass the clarified sugar solution through an ion exchanger 13 (Fig. 1) having, in the exchange position, a monovalent ion, for example, sodium in the case of cation resin and chloride in the case of anion resin. Because of the substantially lower cost and higher capacity, it is preferred to utilize cation exchange resin in the ion exclusion treatment and as a consequence in the priminary treatment. That is to say, the clarified molasses is passed through a bed 14 (Fig. 2) of suitable cation exchange material having a monovalent ion, preferably sodium, capable of being replaced by the calcium and magnesium or other divalent or trivalent ions in the molasses solution.

Among the numerous cation exchange materials suitable for this purpose are the so-called high capacity bead-like resins which comprise a sulphonated styrene-divinylbenzene polymerizate. Typical of such resins are C–20 (Chemical Process Co.) and Dowex 50 having a particle size of about 16 to 50 mesh and varying in cross-linkage from 4 to 10 percent. The resin is regenerated with a monovalent alkaline metal salt, preferably sodium chloride, to provide a sodium ion in the exchange position.

The resin column 14 of a suitable volume and depth is confined in the tank 15 of the ion exchanger 13 which is of the downflow type and equipped with conventional inlet and outlet distributors 16 and 17 and suitable piping for enabling the resin to be regenerated in accordance with a special procedure which we have found to be highly advantageous in effecting more complete removal of the objectionable multivalent ions than has been possible heretofore.

This procedure involves backwashing the column 14 with water in the usual way after substantial exhaustion. Then, the regenerating solution, 10 percent sodium chloride, is pumped into the bottom of the tank through the distributor 17 and thus caused to flow (for example at the rate of 2.5 gal. per sq. ft. per min. of bed area) upwardly through the resin bed and allowed to flow out through the distributor 16 which is located at the upper end of the settled bed. To prevent objectionable expansion of the bed during such upflow, water is flowed simultaneously (for example at a rate of 3.5 g.p.m. sq. ft.) into the upper end of the tank through a distributor 18 and passed downwardly so as to combine with the regenerant at the distributor 16 before flowing out of the tank. Expansion of the bed into the downwardly advancing column of water is thus prevented thereby providing for efficient use of the regenerant. The excess regenerant was rinsed out by water flowing at the above rates.

By thus flowing the salt solution in a direction opposite to the downflow of the sugar solution during the service cycle of the ion exchanger 13, a more complete removal of the calcium and magnesium ions is achieved, and those divalent ions which remain in the resin are disposed in a portion of the bed most favorable for effective retention during the ensuing service cycle. That is to say, the lower end portion of the column is most thoroughly regenerated, any remaining calcium and magnesium ions being disposed in the upper part of the column. Since this part is the first to be contacted by the downflowing molasses solution in the next service cycle, the danger of such ions leaking through the column by a regenerating action of the products of the ion exchange reaction is effectually minimized.

Considering now the manner of practicing the present invention utilizing the molecular exclusion method first described above, it is preferred to employ a cation exchange resin rather than an anion exchange resin. Of the numerous cation exchange resins now available are a so-called strongly acid cation exchange resin comprising a sulphonated styrene-divinylbenzene polymerizate having a cross-linkage or percent of divinylbenzene in the hydrogen form no greater than four and a so-called mesh range of 50–100 (particle size .297–.149 mm.). Resins of this character sold under the trade designations of C–20 (Chemical Process Co.) with 4 percent cross-linkage of Dowex 50 x 4 (Dow Chemical Co.) comprise tiny spheres which when assembled in side by side contact to provide a confined column occupy about 65–70 percent of the total bed volume, the remainder being void spaces. Owing to its high porosity, such resin will absorb and hold within the granules themselves an amount of water equal approximately to about 49 percent of the total bed volume or 69 percent of the bed weight.

In the molecular exclusion step of the improved process, the resin 20 is confined in a tank 21 (Fig. 2) having an upper inlet distributor 22 through which either hot water from a storage tank 23 or the previously treated sugar solution from a storage tank 24 may be admitted through valves 25 and 26. Preferably, the water in the tank 23 is free of divalent cations. By heaters such as steam coils in the tanks 23, 24, the water and molasses are held at a temperature of about 180 deg. F. which is also maintained within the ion exclusion column 20 by suitable insulation 27 surrounding the tank 21. An outlet distributor 28 disposed below the usual support 29 communicates with parallel pipes incorporating valves 31, 32, and 33 which may be operated selectively to enable the effluent to be separated into the desired fractions and directed to a waste line 34 or to storage tanks 35 and 36. Through a suitable pumping system 37, the effluent fraction in the tank 35 may be returned to the tank 24 or combined with the raw sugar solution at a suitable point in the defecation apparatus 10.

The flow through the excluder 30 may be induced by gravity or a suitable pump and preferably is regulated, as by an adjustable valve 38 in the tank outlet, to maintain the flow constant throughout each cycle. This permits the operation of the valves to establish the different influent flows and divide the effluent to be effected by the action of an automatic timer of well known construction programming the energization of solenoids 61 by which the different valves are actuated. As an alternative, the valves may be operated and the entire cycle programmed in response to predetermined changes in the conductivity and density of the effluent as measured by conventional instruments.

The manner in which the effluent concentrations of sugar and nonsugar solids vary during each ion exclusion cycle is charted in Fig. 3. For convenience, the abscissas are percentages of the effluent volume $Ve$ divided by the total volume $Vt$ of the resin bed 20. Similarly, the ordinates are expressed as concentration of the effluent $Ce$ divided by the concentration $Cf$ of the influent or feed solution as delivered to the ion exclusion column. Thus, at the point 40 in the typical cycle illustrated in Fig. 3, the effluent which had passed through the bed 20 was equal to .63 percent of the total bed volume. At this time the concentration of the nonsugar solids in the effluent was 83 percent of that in the feed solution while the sugar concentration was only 10 percent.

By virtue of the exclusion action, the concentrations of sugar and nonsugar solids change progressively through each cycle, the curves 43 and 44 showing these changing concentrations overlapping each other as shown in Fig. 3. By operating the valves 31, 32 and 33 at proper points 40, 41 and 42 during each cycle, the effluent may be divided into a waste or discardable fraction containing a predominating amount of the contaminating or nonsugar solids and a product fraction in which substantially the entire solid content is sugar. To provide this high concentration without substantial loss of sugar, a third or intermediate fraction is separated and recycled through the exclusion step thereby further augmenting the sugar recovery.

In a test of the improved process comprising over 3000 exclusion cycles, Barahona "B" molasses of the approximate composition given above was passed through the ion exchanger 13 and the ion excluder 30 and performance curves were plotted at frequent intervals.

Successive batches of the molasses were diluted with water to a Brix of 56.4 and then defecated with lime and phosphoric acid at a temperature of 180 deg. F. The pH was increased to 9.5 by the lime and reduced to 6.9 by the phosphoric acid. After filtering under vacuum, the resultant solution was 35.1 Brix. The total of the divalent ions in this solution was 5400 p.p.m. calculated as calcium carbonate.

The molasses thus clarified and diluted was passed through the ion exchanger 13 regenerated with sodium chloride as above described thus reducing the divalent cation content, calcium and magnesium, to 180 p.p.m. In the ion exchange, the solution became diluted to a Brix of 24.9 which represents the total dissolved solids. The polarity as measured with a standard polariscope was 15.0. Thus, the percent sucrose of the total dissolved solids was 15.0/24.9 or 60.3 percent.

For exclusion step, the container 21, a 1⅚″ I.D. x 48 inch glass tube, was charged with Dowex 50 x 4, 50 x 100 mesh resin in the sodium form. When submerged in water, the resin occupied 800 cc. of which 280 cc. were voids. The tanks 23 and 24 were maintained at 180 deg. F.

In each exclusion cycle, 224 cc. of the treated molasses was fed through the distributor 22 and allowed to gravitate down through the column 20 at a constant rate adjusted to 20 cc. per minute. This flow of feed solution was followed at the same flow rate by 456 cc. of water from the tank 23 free of divalent cations. By means of an automatic timer, each cycle lasted 34 minutes during which the valve 25 was opened for 11.2 minutes to measure the molasses influent, the valve 26 being opened to pass hot water through the column 20 during the remaining 22.8 minutes of the cycle.

The dividing points 40, 41 and 42 (Fig. 3) in the cycle were determined by sampling the effluent at frequent intervals during the first few cycles, chemically testing the samples to determine the salt and sugar concentrations, and plotting curves similar to Fig. 3 for the test cycles. The timer controlling the cycle was then adjusted to provide for closing of the valve 31 and opening the valve 32 shortly after sugar started to appear in the effluent thereby establishing the dividing point 40 between the waste effluent directed to the drain and the recycle fraction directed to the tank 35. In a similar way, the timer was adjusted to close the valve 32 and open the valve 33 after the lapse of the next 5.5 minutes of the cycle thus separating the second and third fractions at the point 41 near the intersection of the curves 43 and 44. At the end of the 34 minute interval or at the point 42, the timer was set to deenergize the solenoid of the valve 33 and energize that of the valve 31 thereby conditioning the system for directing the next effluent flow to the drain.

At the end of the cycle as indicated by the line 60, the timer operated the valves 25 and 26 to interrupt the flow of hot water and again start the flow of the feed solution to the inlet 22 thereby initiating the next exclusion cycle. Periodically, the second fraction accumulating in the tank 35 was returned to the tank 24 for recirculation through the exclusion column.

Taking cycle No. 447 as a typical one, the composition of the effluent from the exclusion column changed as shown in Fig. 3. That is to say, the molasses solution fed into the column during the initial part of the cycle displaced the water in the void spaces and sugar diffused into the pores of the resin granules while the nonsugar solids were excluded and passed gradually down through the column. After fourteen minutes of the cycle, the entire charge of 224 cc. of molasses and 56 cc. of the hot water had passed the distributor 22, the excluded solids started to appear in the effluent as indicated at 50. The concentration then increased rapidly as indicated by the steep slope of the curve 43 and was approaching that in the original feed solution by the time sugar started to appear at 52 in the effluent after .58 of the cycle time. By terminating the first fraction at 40, only a small amount of the total sugar was discarded in the first fraction along with a substantial portion of the nonsugar solids represented by the areas beneath the curves 43 and 44 and to the left of the dividing line 40.

In the effluent directed to the recycle tank 35 in the ensuing part of the cycle, both the salt and sugar concentrations increased abruptly until at .73 of the cycle, the salt concentration reached the maximum at 51 and started to decrease rapidly. About at the point of intersection of the decreasing salt and increasing sugar curves, the second fraction was terminated, and the effluent was diverted to the product tank 36 for the remainder of the cycle. Comparing the areas beneath the curves 43 and 44, it will be seen that the second effluent fraction contained a predominating amount of nonsugars.

The sucrose concentration continued to increase until .83 of the cycle time had elapsed as indicated at 53 and then began to decrease only shortly before all of the excluded nonsugar solids had passed the ion excluder as indicated at 54. The decrease in sugar concentration continued beyond the end of the cycle time and through .35 of the next cycle as indicated at 55.

For the cycle No. 447, the average composition and characteristics of the influent and effluent solutions at various points in the process described above are shown in the following table.

Table 1

| | "B" molasses ||| Na Exchanged influent | Effluent fraction |||
|---|---|---|---|---|---|---|---|
| | Raw | Diluted | Defecated filtered | | 1st waste | 2nd recycle | 3rd product |
| Brix or percent total solids | 82.2 | 56.4 | 35.1 | 24.9 | 3.0 | 15.5 | 15.7 |
| Percent sucrose [1] | 41.2 | 28.2 | 19.3 | 15.0 | 1.0 | 10.0 | 11.0 |
| Apparent purity [2] | 50.1 | 50.1 | 55.0 | 60.3 | 33.3 | 66.4 | 70.0 |
| pH | | | 6.9 | 6.9 | 6.8 | 6.9 | 7.1 |
| Conductivity, mmhos | | | | 28,400 | 11,400 | 23,000 | 1,500 |
| Specific gravity | | 1.269 | 1.154 | 1.105 | 1.011 | 1.063 | 1.064 |
| Divalent ions, p.p.m., CaCO₃ | | | 5,400 | 180.0 | 5.0 | 0.0 | 0.0 |

[1] Based on polarity measurement.

[2] Purity = $\dfrac{\text{percent sucrose}}{\text{Brix}}$

To summarize Table I, the original raw molasses contained 82.2 percent total solids, of which 50.1 percent was sucrose, and 49.9 percent was nonsugar solids. By the preliminary defecation and ion exchange treatments, the purity was increased to 60.3. By eliminating a substantial part of the nonsugars in the first exclusion fraction, the purity was increased to 66.4 in the second or recycle fraction and to 70.0 in the third or product fraction. This means that the original molasses contained 49.9 percent nonsugar solids of total solids and after the first molecular exclusion step the product contained 29.7 percent nonsugar solids of total solids. That is to say, upon evaporation of water from the product fraction to provide the same concentration (82.2 Brix) of total solids as the original molasses, each 100 pounds would contain 24.6 pounds of impurities and 57.6 pounds of sugar. In this ratio, another efficient crystallization strike may be taken thereby recovering a substantial part of the sugar which would normally remain in the final molasses. At the same time, substantially all of the other sugar from the original molasses appears in the recycle fraction and may be recovered in subsequent exclusion cycles.

It will also be observed that by the preliminary ion exchange treatment of the raw sugar solution, the multivalent ions were reduced from 5400 to 180 p.p.m. As a result of this substantial elimination of multivalent ions, it was noted in the above test that during several hundred repeated cycles the water holding capacity and volume of the resin 20 remained substanially constant, thus indicating that the size of the pores in the resin particles remained substantially unaffected in the exclusion step. Thus the exclusion column continued to operate at high efficiency as evidenced by the close duplication of the curves 43 and 44 in the repeated cycles. The maintenance of such unexpected efficiency is believed to be attributable to the action of the predominating sodium ions in the influent in deterring the adsorption of calcium and magnesium by the resin of the exclusion column.

Although no appreciable loss in efficiency was observed, the exclusion column was washed with a 10 percent sodium chloride solution after about 450 cycles thereby removing the calcium and magnesium ions which has been adsorbed by ion exchange in the resin of the ion exclusion column. In such conditioning of the column 20, the procedure used in regenerating conventional ion exchangers was followed including backwashing of the column through the distributor 63 with water free of multivalent cations, flowing the brine down through the column, and rinsing out the excess brine with water free of multivalent cations. Then, the molecular exclusion cycles were continued following the procedure described above. The dotted line curves 43' and 44' for cycle No. 898 are superimposed on the corresponding curves from cycle No. 448. In the 898 cycle, it will be observed that sugar started to appear in the effluent earlier in the cycle, that is, at a point 57 spaced from the corresponding point in cycle No. 448. Also, salt continued to appear in the effluent to the point 58 and for a larger part of the cycle thereby reducing the ratio of sugar to salt in the product fraction of the effluent. In cycle No. 898, the peaks of both the salt and sugar curves are somewhat lower thereby indicating that the resin was slightly less effective in separating the sugar and nonsugar solids. From this result, it appears to be desirable, when using the exclusion resin above described, to rejuvenate the resin by washing with brine at several hundred cycle intervals depending on the composition of the molasses being treated.

When the anion type of ion exchange resin is employed for the molecular exclusion step in the process as described above, several resins are now available. Among those that may be used in the excluder 30 are those sold by Dow Chemical Company under the trade name of Dowex 1 which is 50–100 mesh in size and has a cross-linkage of about 6 percent and by Rohm & Haas Company as IRA–400 of similar size and cross-linkage. The resins are normally supplied with monovalent ions, usually chloride in the exchange position, and would in service use in the improved process be washed periodically with a sodium chloride solution to insure continuance of the monovalent character of the anion in the exchange position.

These same anion exchange resins may be employed in the ion exchanger 13 and used in the preliminary treatment of the clarified molasses to convert the multivalent anions thereof to monovalent ions preferably chloride because of its cheapness. That is to say, the exchanger 13 would be regenerated as before and by contacting the resin with brine in accordance with the procedure above described. Each of the anion resins above referred to is of the so-called highly basic type 1 in which the active exchange radical is a quaternary ammonium group.

The foregoing process in which the sugar is adsorbed and the ionizable components are excluded is particularly effective in purifying molasses because of the character of the color bodies which must be removed along with the inorganic salts. These bodies are organic and therefore non-ionizable substances but are of such large molecular size and weight as compared to sugar that they are not adsorbed in any substantial amount by the resin. As a result, nearly all of the color bodies, in spite of their non-ionizable character, appear in the first fraction of the exclusion cycle thus facilitating the separation of sugar which is retained in the resin bed.

The exclusion cycle may however be carried out by following the second method above described, that is to say, by using in the excluder 30 (Fig. 2) an excluding agent which excludes the sugar so that the latter appears in the first fraction while the inorganic salts are adsorbed by the resin and rinsed out in the final fraction of the cycle. As before and due to their non-ionizable character, the color bodies are not adsorbed but remain with the sugar and appear with the latter in the first fraction of the effluent leaving the excluder.

The ion exchange resins that may be utilized in this reverse type of molecular exclusion are described by the manufacturer, Dow Chemical Company, as being prepared by polymerizing an anionic monomer, for example, acrylic acid, inside the pores of an anion exchange resin, for example, Dowex 1, or a cationic monomer inside a cationic exchange resin. The resulting linear polymer is trapped inside the cross-linked exchange resin which is chemically and physically stable and comprises a mixture of cation and anion exchangers with the mixing taking place at the molecular level. The particles are 50–100 mesh and the resin as produced from Dowex 1 is now sold under the name Retardian 11A8.

Figure 2:
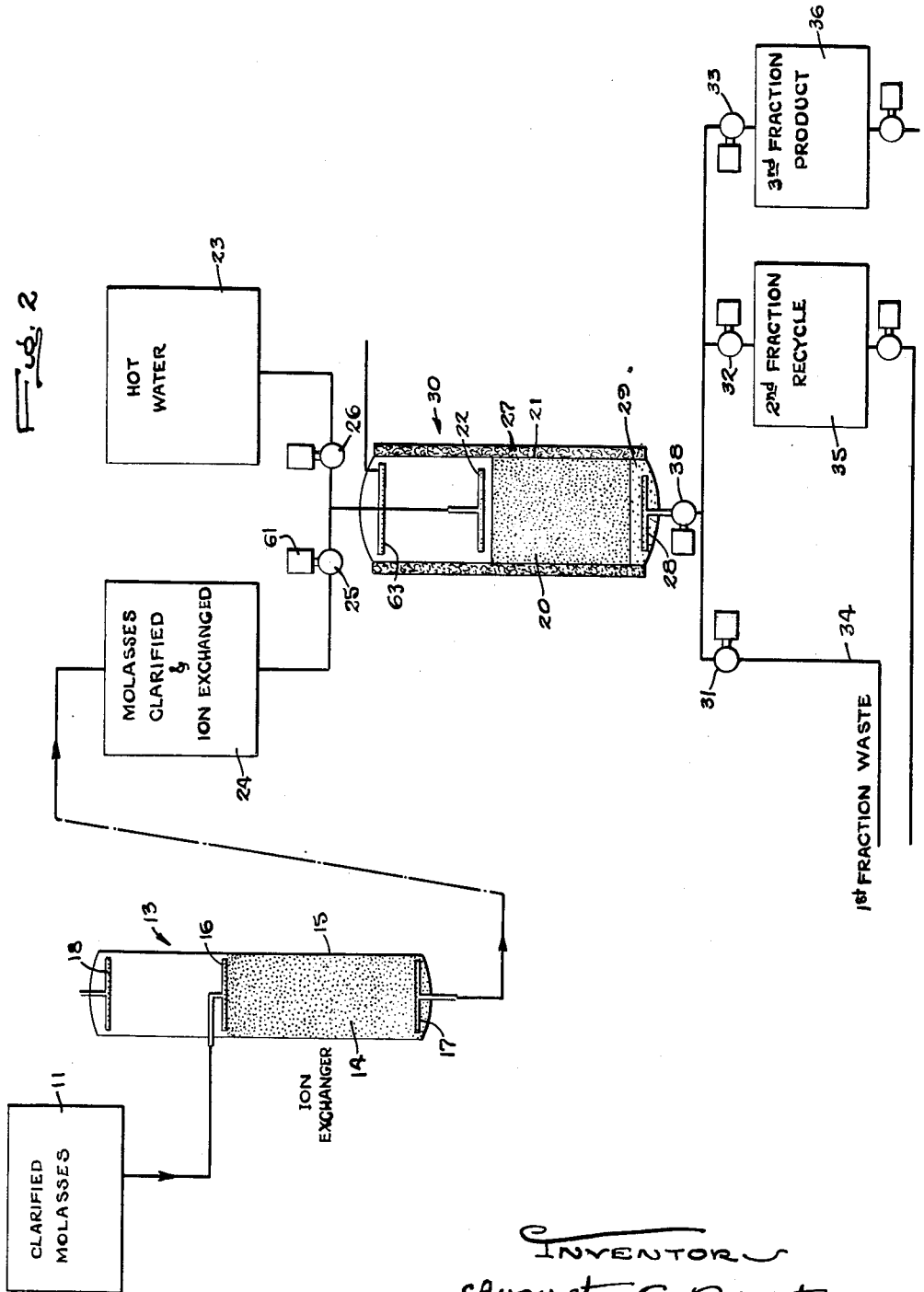
Fig. 2 is a diagrammatic view of the apparatus used in practicing the invention.

In using the resin last described in practicing the present invention, the apparatus shown in Fig. 2 and the procedure already described is followed including the pre-treatment of the clarified molasses solution as well as the recycling or repeated treatment of the second fraction of each exclusion cycle. For this purpose and in accordance with the present invention, the multivalent cations and anions of the ionizable solutes in the molasses solution are first converted to monovalent ions by treatment in appropriate ion exchangers. This may be accomplished by passing the solution successively through columns of cation and anion exchange resins both regenerated with sodium chloride or by passing the solution through a single bed comprising a mixture of cation and anion exchange resins which may remain mixed together while being regenerated simultaneously with a sodium chloride solution of the proper concentration. Thus, the divalent calcium and magnesium ions are replaced by sodium ions, and monovalent chlorine is substituted for the divalent sulphate, trivalent phosphate or other multivalent ions in the molasses.

After such treatment, the exclusion cycles are carried on in the manner above described, preferably at a temperature of about 120 deg. F. In this case, however, only the inorganic salts are adsorbed by the resin, the color bodies passing on through the resin bed along with the sugar which is excluded. The second fraction taken as before will contain both sugar and nonsugars and may be recycled through the same exclusion column. Each exclusion cycle is concluded by washing the adsorbed inorganic salts out of the resin bed.

After the removal of the inorganic salts in this way, the clarified molasses solution may be subjected to another strike. Owing however to the retention of the color bodies in the sugar solute, crystallization will be impaired and the quantity of white sugar obtained will be less than with the process first described. For this reason, full advantage cannot be taken of the higher exclusion efficiency that may be achieved with the second exclusion method as compared to the first exclusion method in which the color bodies as well as inorganic salts are separated from the sugar. Accordingly, the procedure first described is preferred where the second fraction of the exclusion effluent is to be recycled through the same resin bed as the original clarified molasses solution.

We have discovered that the higher exclusion efficiency of the second exclusion method as compared with the first may be availed of by combining these two methods in the overall purifying process, that is, by utilizing the first exclusion method in treating the clarified molasses solution and the second or reverse exclusion method in treating the second fraction of the first method after exclusion of a majority of the color bodies along with the ionizable solute in the first fraction thereof. It has been found that the small amount of the color bodies appearing in the second fraction of the first exclusion method does not materially impair the efficiency of the resin used in the second exclusion method.

The combination process above described using the two different molecular exclusion methods may be practiced in the apparatus shown in Fig. 4 in which the parts common to Fig. 2 are duplicated and bear the same reference numerals as before. In operating this part of the system to exclude the nonsugar solutes as the first fraction, the same materials are used and the same procedures are followed as in the process first described. As before, the first or waste fraction is discarded and the third or sugar fraction is retained ready for further crystallization to produce the desired product or sugar.

To complete the combination process, the second fraction from each cycle of the exclusion column 30 is subjected to further treatment first in an anion exchanger 70 and then in an excluder 71 operated in the same manner as the first excluder 30 but containing the anion-cation resin (Retardian 11A8) above described so as to exclude sugar and produce a first fraction or pure sugar solution, a second fraction to be recycled containing both sugar and non-sugars, and a third or waste fraction containing the adsorbed ionizable components.

Since the resin used in the excluder 71 is composed in part of anion exchange material, it is necessary in accordance with the present invention to convert the multivalent anions, mostly sulphates and phosphates, in the partially clarified solution leaving the excluder 30, to monovalent anions. To this end, a suitable anion exchange resin such as Dowex 1 or the IRA–400 mentioned above is arranged in a column 72 in a tank 70 to which the recycle fraction from the first exclusion step is delivered through a pipe 73. This resin is regenerated periodically in the usual way with a solution having a monovalent anion, for example, a sodium chloride solution. As a result of such regeneration, the sulphate and phosphate ions picked up in previous cycles are exchanged for a chloride ion.

In passing through the exchanger 70, the multivalent ions remaining in the sugar solution are converted to monovalent chloride. Since the original molasses solution was treated in the sodium cation exchanger 30, substantially all of the cations in the solution leaving the tank 35 and passing through the exchanger 70 will be monovalent sodium and therefore will not affect the efficiency of the resin used in the excluder 71. The latter comprises a tank 74 having its inlet connected through a valve 75 from a storage tank 76 which receives the effluent from the ion exchanger 70.

As in the case of the excluder 30, the tank 74 of the second excluder 71 contains a column 77 of the proper resin (Retardian 11A8) in which, as supplied by the manufacturer, the anions and cations in the exchange positions are usually monovalent. However, to insure such a condition before use in the present process and preferably after a number of service cycles, for example, one hundred cycles, this resin is washed with a brine solution. Also, it is preferred that the sugar solution delivered through this excluder be maintained at about 120 deg. F., such heating when necessary being accomplished by steam coils in the storage tank 35.

The outlet 78 of the excluder 71 communicates through valves 79—82 with tanks 83, 84, 85 for receiving the three fractions from each cycle of the excluder 71. Through pipes 86, 87 and 97 with valves 88, 89, and 98 therein, the second fraction from the excluder 71 may be subjected to further purification by recirculating the same through the excluder 71 alone or through both of the excluders 30 and 71 or to the initial storage tank 10.

The combination process above described was tested in a number of exclusion cycles using molasses from Puerto Rico similar in character to the Barahona molasses used in the tests first described above. The same apparatus was used, the same procedure followed, and the same measurements were made, these being recorded in the following table:

Table II

| | Brix or percent total solids | Percent sucrose | True purity | pH | Conductivity mmhos | Divalent ions p.p.m. CaCO₃ | Chloride ions p.p.m. CaCO₃ |
|---|---|---|---|---|---|---|---|
| Clarified molasses: | | | | | | | |
| Raw | 84.0 | 43.5 | 51.8 | | | | |
| Clarified | | | | | | | |
| Defecated | 42.6 | 22.8 | 53.3 | 6.3 | 27,500 | 14,400 | |
| Filtered | | | | | | | |
| Na exchanged influent | 35.4 | 20.4 | 58.6 | 6.6 | 27,500 | 600 | |
| Effluent fraction from excluder 30: | | | | | | | |
| 1st waste | 5.1 | 0 | 0 | 6.4 | 12,500 | 100 | |
| 2nd recycle | 15.1 | 10.4 | 69.2 | 6.9 | 18,000 | 100 | 5,500 |
| 3rd product | 9.6 | 7.4 | 77.0 | 7.65 | 2,000 | 35 | |
| Effluent from ion exchanger 70 | 13.0 | 9.5 | 73.0 | 7.0 | 19,000 | 100 | 10,600 |
| Effluent fraction from excluder 71: | | | | | | | |
| 1st sugar | 9.7 | 8.0 | 82.5 | 8.8 | 2,600 | 50 | |
| 2nd recycle | 10.5 | 8.15 | 77.6 | 8.7 | 6,000 | 25 | |
| 3rd waste | 2.0 | | | 8.2 | 8,250 | 10 | 4,350 |

The partially clarified sugar solution obtained from a succession of the second fractions from the excluder 30 was passed through a small size anion exchanger regenerated with sodium chloride to produce the solution of column 6 and prepare the same for the second exclusion cycle. For the latter, a bed of the Retardian resin having a volume of 710 cc. was employed, contained in a 1¹⁵⁄₁₆ inch glass tube. In each cycle, 355 cc. of the solution at 120 deg. F. was passed down through the column at the rate of 35 cc. per minute. This flow was followed at the same rate by 710 cc. of warm water free of multivalent ions. A second flow of the sugar solution was then started and followed by another water rinse so as to provide a continuous inflow to the column during a succession of exclusion cycles as indicated in Fig. 5.

As before, the dividing points 90, 91 and 92 (Fig. 5) in each cycle were determined in the initial cycles by sampling the effluent at frequent intervals and chemically testing the samples to determine the sugar concentrations and determine the setting of the timer used thereafter to select the fractions in each cycle. The manner in which the effluent concentrations varied during a typical one of the cycles is shown by the curves 93 and 94. The maximum concentration of sugar excluded in the first fraction occurred shortly after termination of the feed at 95 and about the time that the first ionized components appeared in the effluent as indicated at 96.

From the foregoing, it will be apparent that the purity of a molasses solution can be increased sufficiently to permit another crystallization strike to be taken and the yield of sugar, usually 98 percent pure, to be increased substantially. Based on the test result recorded in Table I, 76.0 percent of the sugar in the molasses is recovered when the molasses solution is treated with the first described process using the apparatus shown in Fig. 2 in which the second fraction of the effluent from the excluder 30 is recycled through this same excluder.

The total recovery of sugar is increased to 83.5 percent by utilizing the combination process with the apparatus shown in Fig. 4. This further increase is attributable to the passing of the second effluent fraction from the first exclusion step through the different kind of resin in the excluder 71 whose action has been found to be substantially more efficient than that of the resin used in the excluder 30, provided however that the major portion of the color bodies are first removed as contemplated by the present invention by the action of the excluder 30 using the resin above described. These percentages are based on the final molasses, after crystallization, having a true purity of 37.0 percent.

From the test results as shown in Table II, it will be apparent that the raw molasses contained 84.0 percent total solids of which 51.8 was sucrose and 48.2 was nonsugar solids. By the preliminary defecation and ion exchange treatments to clarify the solution, this purity was increased to 53.5. By eliminating a substantial part of the nonsugars in the first exclusion fraction, the purity was increased to 69.2 in the second or recycle fraction and to 77.0 in the third or product fraction (column 3, line 6). This means that the original molasses contained 48.2 percent nonsugar solids of total solids and after the first molecular exclusion step, the product fraction contained 22.9 percent nonsugar solids of total solids. That is to say, upon evaporation of water from the product fraction to provide the same concentration (84.0 Brix) of total solids as the original molasses, each 100 pounds would contain 19.3 pounds of impurities and 64.7 pounds of sugar. In this ratio, another efficient crystallization strike may be taken of this product of the first exclusion step.

Substantially all of the other sugar from the original molasses appears in the recycle fraction. This fraction contained sucrose with a purity of 69.2 percent, and nonsugar solids in the amount of 29.6 percent of total solids. In the second exclusion step using the Retardian 11A8 resin, the first fraction increased to a purity of 82.5 percent, and nonsugar solids in the amount of 17.5 percent of total solids. The second fraction then contained 22.4 percent nonsugar solids of total solids and the third fraction 100 percent nonsugar solids of total solids.

Because of its cheapness and the monovalent character of its anion and cation, it is preferred to use a solution of common salt as above described as the regenerant for imparting exchangeable monovalent ions to the resins used in the ion exchangers 13 and 70 and thereby eliminate the multivalent ions of the molasses. Obviously, other regenerants having monovalent cations or monovalent acid radicals or anions may be used. For example, the exchanged cation may be any of the alkali metals or ammonium, which is the equivalent of such ions. Thus the exchanger would be regenerated by a solution containing a salt of the selected monovalent cation. Similarly, the replaceable monovalent anion of the exchanger 70 may be any halogen, nitrate or bicarbonate simply by employing the corresponding salt of such an anion in regenerating the exchanger 70.

In the appended claims, the term "monovalent cation" is intended to include the various cations mentioned above, and the term "monovalent anion" contemplates the anions mentioned above.

This application is a continuation-in-part of our copending application Serial No. 590,460, filed June 11, 1956, now abandoned.

The process herein disclosed apart from the preliminary treatment of the sugar solution by ion exchange forms the subject matter of our copending divisional application Serial No. 832,773, filed August 10, 1959.

We claim as our invention:

1. The method of purifying a clarified sugar solution such as molasses containing highly ionized salts having monovalent and divalent cations which includes the steps of passing the solution through a column of cation exchange resin having a monovalent alkali metal as the replaceable ion whereby to remove said divalent ions from the solution, passing the treated solution through a bed of cation exchange resin particles having a monovalent alkali metal ion in the replaceable position and capable of adsorbing the sugar in the solution while excluding ionizable salts, thereafter feeding water through said bed, and dividing the effluent into a first fraction in which said excluded salts constitute a major portion of the total solids, a second fraction containing both the excluded salts and part of the sugar, and a third fraction in which sugar constitutes a major portion of the total solids.

2. The method of purifying a clarified sugar solution such as molasses containing highly ionized salts having divalent ions which includes the steps of passing the solution through a column of ion exchange resin having a monovalent alkali metal ion capable of replacing said divalent ions, passing the treated solution through a bed of ion exchange resin particles having a similarly charged monovalent ino in the replaceable position and capable of adsorbing the surgar in the solution while excluding ionizable salts, thereafter feeding water through said bed, and dividing the effluent into a first fraction in which said excluded salts constitute a major portion of the total solids, a second fraction containing both the excluded salts and part of the sugar, and a third fraction in which sugar constitutes a major portion of the total solids.

3. The method defined in claim 1 in which said second effluent fraction is combined with the influent solution subsequently fed into said ion exclusion bed.

4. The method defined in claim 1 in which said influent solution and said wash water, while in contact with said ion exclusion bed, are maintained at a temperature of approximately 180 deg. F.

5. The method defined in claim 1 in which said solution is flowed downwardly through said ion exchange column after regeneration thereof by passing a sodium chloride solution upwardly through the column.

6. The method of purifying a clarified solution containing sugar such as molasses as one dissolved solid and a second dissolved solid comprising a highly ionized salt having multivalent ions, said method including the steps of contacting said clarified solution with ion exchange resin having monovalent ions capable of replacing said multivalent ions of said second solid, contacting the treated solution with ion exchange resin particles having similarly charged monovalent ions in replaceable positions and capable of adsorbing and retaining in the pores of the resin particles a major portion of one of said solids while excluding a major portion of the other solid and allowing the same to pass said ion exchange resin particles, thereafter contacting said ion exchange resin particles with water to wash out said retained solid, and dividing the effluent passing said particles into a first fraction in which said passed solids constitute a major portion of the total solids, a second fraction containing both of said solids and a third fraction in which said retained solid constitutes a major portion of the total solids.

7. The method of purifying a clarified solution containing sugar such as molasses as one solute and a second solute comprising a highly ionized salt having multivalent anions, said method including the steps of contacting said clarified solution with ion exchange resin having monovalent anions capable of replacing said multivalent anions of said second solute, contacting the treated solution with ion exchange resin particles having similarly charged monovalent anions in replaceable positions and capable of adsorbing and retaining in the pores of the resin particles a major portion of said salt solute while excluding a major portion of said sugar solute and allowing the latter to pass said ion exchange resin particles, thereafter contacting said ion exchange resin particles with water to wash out said sugar solute, and dividing the effluent passing said particles into a first fraction in which said sugar solute constitutes a major portion of the total solids, a second fraction containing both of said solutes and a third fraction in which said salt solute constitutes a major portion of the total solids.

8. The method of purifying a clarified solution containing sugar such as molasses as one solute and a second solute comprising a highly ionized salt having multivalent cations, said method including the steps of contacting said clarified solution with ion exchange resin having monovalent cations capable of replacing said multivalent cations of said second solute, contacting the treated solution with ion exchange resin particles having similarly charged monovalent cations in replaceable positions and capable of adsorbing and retaining in the pores of the resin particles a major portion of said sugar solute while excluding a major portion of the salt solute and allowing the same to pass said ion exchange resin particles, thereafter contacting said ion exchange resin particles with water to wash out said sugar solid, and dividing the effluent passing said particles into a first fraction in which said salt solute constitutes a major portion of the total solids, a second fraction containing both of said solutes and a third fraction in which said sugar solute constitutes a major portion of the total solids.

9. The method defined by claim 8 which includes the steps of contacting said second fraction with an anion exchange resin having monovalent anions capable of replacing any multivalent anions of said salt solute, contacting the treated solution with ion exchange resin particles having similarly charged monovalent anions in replaceable positions and capable of adsorbing and retaining said salt solute while excluding a major portion of said sugar solute and allowing the latter to pass by said anion exchange resin particles, and thereafter contacting the latter with water to wash out said salt solute, and dividing the effluent passing said anion resin particles into a first fraction in which said sugar solute constitutes a major portion of the total solids, a second fraction containing both of said solutes and a third fraction in which said solt solute constitutes a major portion of the total solids.

10. The method of purifying a clarified solution containing sugar such as molasses as one dissolved solute and a second dissolved solute comprising a highly ionized salt having multivalent anions and cations, said method including the steps of contacting said clarified solution with ion exchange resins having monovalent cations and anions capable of replacing said multivalent cations and anions of said second solute, contacting the treated solution with ion exchange resin particles having monovalent cations in replaceable positions and capable of adsorbing and retaining in the pores of the resin particles a major portion of said sugar solute while excluding a major portion of the salt solute and allowing the latter to pass said such resin particles, thereafter contacting said ion exchange resin particles with water to wash out said retained solute, dividing the effluent passing said particles into a first fraction in which said salt solute constitutes a major portion of the total solids, a second fraction containing both of said solutes and a third fraction in which said retained solute constitutes a major portion of the total solids, contacting said second fraction with second ion exchange resin particles capable of adsorbing and retaining in the pores thereof a major portion of said salt solute while excluding the sugar solute and allowing the latter to pass the second particles, thereafter contacting the second particles with water to wash out said salt solute, and dividing the effluent passing said second particles into a first fraction containing said sugar solute as the major solid, a second fraction containing both of said solutes and a third fraction in which said salt solute constitutes the major solid.

References Cited in the file of this patent

UNITED STATES PATENTS

| | | |
|---|---|---|
| 2,684,331 | Bauman | July 20, 1954 |
| 2,771,193 | Simpson et al. | Nov. 20, 1956 |
| 2,772,237 | Bauman et al. | Nov. 27, 1956 |

OTHER REFERENCES

"Synthetic Ion Exchangers," Osborn, Chapman and Hall, Ltd., London, pp. 53-64.